K. FUKUDA.
ELASTIC TIRE.
APPLICATION FILED OCT. 30, 1920.
1,377,011. Patented May 3, 1921.
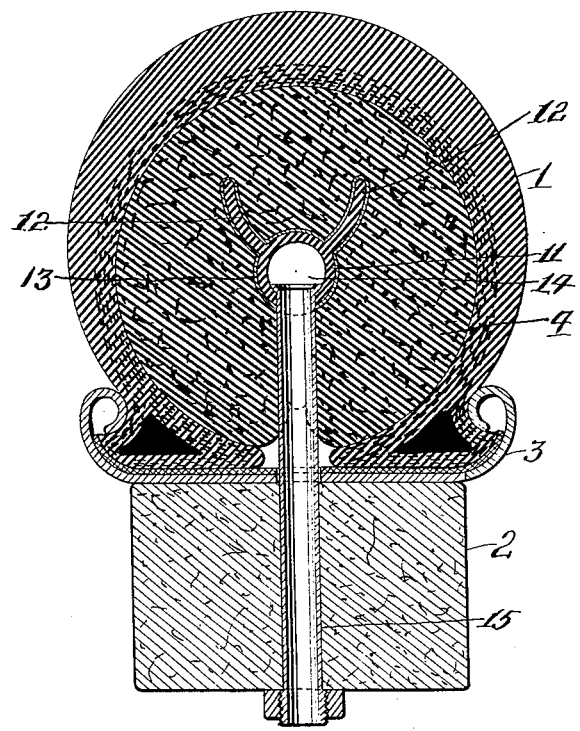
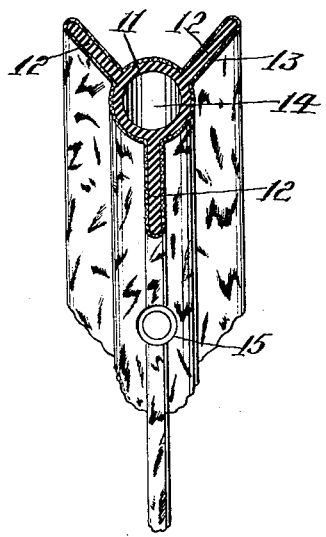
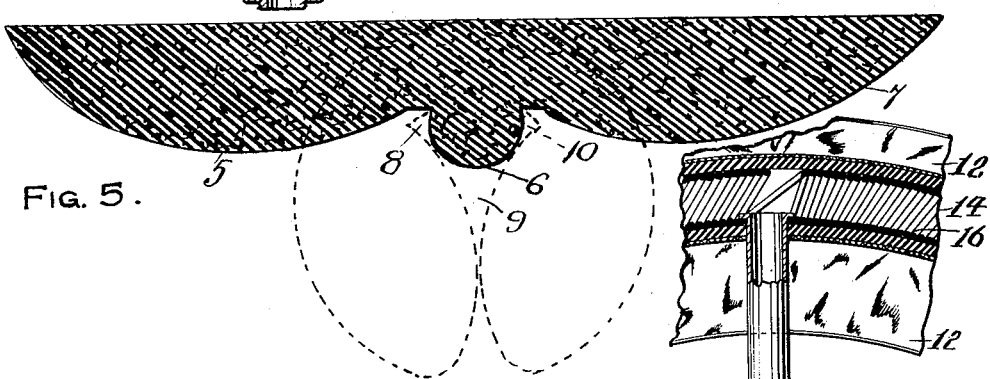
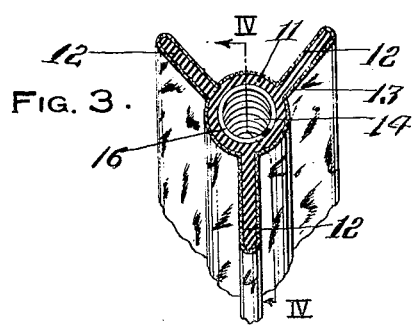
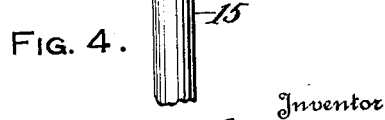

UNITED STATES PATENT OFFICE.

KINSUKE FUKUDA, OF TOKYO, JAPAN.

ELASTIC TIRE.

1,377,011.  Specification of Letters Patent.  Patented May 3, 1921.

Application filed October 30, 1920. Serial No. 420,596.

*To all whom it may concern:*

Be it known that I, KINSUKE FUKUDA, subject of the Emperor of Japan, residing at Tokyo, Japan, have invented a certain new and useful Improvement in Elastic Tires, of which the following is a specification, reference being had therein to the accompanying drawing.

This invention has relation to elastic tires and relates particularly to tires for automobiles and the like, wherein the tire is composed of a casing of the ordinary character, provided with a filling or packing of elastic material, such as sponge rubber.

It has been found that in tires of this kind there is a considerable amount of heat generated in the packing or filling by friction and compression when the tire is in use, which has a deleterious and sometimes destructive effect upon the packing or filling.

The object of my present invention is to obviate the above mentioned deleterious or destructive effects of heat upon the packing or filling of the tire and my invention consists in the provision of novel means for providing a constant supply or current of air to the interior of the packing or filling at normal atmospheric temperature, whereby the packing or filling will be ventilated and the heat generated in the tire will be absorbed by the air and carried off thereby.

My invention further consists in certain novel constructions and combinations of parts hereinafter described and claimed. In the accompanying drawing in which I have illustrated my invention;

Figure 1 is a transverse sectional view of a portion of the rim of a wheel and a tire having my improvements applied thereto.

Fig. 2 is a fragmentary sectional view of a portion of the tire shown in Fig. 1.

Fig. 3 is a view similar to Fig. 2, illustrating a modified form of the same portion of the tire as that shown in Fig. 2.

Fig. 4 is a vertical sectional view on the line IV—IV of Fig. 3.

Fig. 5 is a transverse sectional view of a part of the elastic packing or filling of the tire shown in Fig. 1, before being folded together to conform to the internal shape of the casing.

Referring first to Fig. 1 of the drawing in which the casing, designated 1, is of the ordinary or any desired form and construction, and is secured in position upon the felly of the wheel by the metallic rim 3, the felly and rim, being also of the ordinary or any desired form and construction.

The packing or filling which I prefer to employ is composed of sponge rubber of rather dense quality and is designated 4, in Fig. 1, and is separately shown in Fig. 5, before being folded or gathered together for insertion in the tire, it being first formed as a straight band or belt having three longitudinally disposed substantially semi-circular ribs and a substantially flat back, the ribs being so proportioned that when the outer edges of the band or belt are folded together, so as to cause the flat back to assume a practically circular form, so as to fit within the casing 1; the ribs, which are designated 5, 6, 7, will be brought into contact with one another so that the packing or filling will then be, except for its spongy character, a practically or nearly solid ring circular in cross-section, as shown in dotted lines in Fig. 5.

It will be noted, however, and as shown in Fig. 5, that if merely folded or gathered together without additional parts, the packing or filling 4, while externally conforming substantially to the internal form of the casing 1, would be left with radially extending narrow spaces designated 8, 9, 10, through failure of the ridges 5, 6, 7 to come into absolutely intimate contact throughout all their surfaces and if the packing or filling were used simply in the form shown in Fig. 5, there would be considerable friction between the contacting surfaces of the ribs with consequent undesirable wear of these surfaces and generation of a deleterious degree of heat.

In order, therefore, to bring the internal surfaces of the packing or filling into intimate contact and for the further purpose of supplying air to or ventilating the interior of the packing or filling, I provide a core such as shown in Figs. 1 and 2 and in modified form in Figs. 3 and 4, this core comprising the hollow circular central portion 11, and the radial wings 12; this core being preferably composed of pure soft rubber and the central portion 11, and wings 12, preferably covered with thin fabric 13.

The central portion 11 of the core is formed with an air passage 14, that extends completely around the core and is kept in constant communication with the outer air by means of radially disposed metallic tubes 15, which extend through the packing or filling 4, the metallic rim 3 and the felly 2, and are open at both ends.

But one of the tubes 15, is shown, but it will be understood that in order to maintain a good circulation of air within the core, a plurality of such tubes should be provided and located at convenient points around the wheel.

In the modified form of core shown in Figs. 3 and 4, I provide a flexible reinforcing lining 16, which is composed of closely coiled wire, this reinforcement being provided to strengthen the central portion of the core and prevent possible accidental collapse of the same, the construction being in other particulars the same as that of the core shown in Figs. 1 and 2.

I claim:

1. A packing for tires composed of a laterally folded ribbed strip and a separately formed core having an internal circumferential air chamber in communication with the outer air.

2. An elastic packing for tires comprising an elastic body portion composed of a band having a plurality of ridges and folded to circular form and a hollow detachable central core having wings disposed between adjacent ridges of the folded body portion, the space within the core being in communication with the outer air.

3. An elastic packing for tires comprising a laterally folded body part and a separately formed core arranged within said body part and provided with an air chamber and having an air conduit leading from said air chamber to a point outside of said packing.

4. A packing for tires comprising a laterally folded sponge rubber body part and a separately formed soft rubber core disposed within said body part and extending circumferentially throughout the body part, said core being formed with a central air chamber and provided with a plurality of air conduits leading from said air chamber to the outer air.

5. A packing for tires comprising an elastic body part formed of a band having a plurality of ridges and so formed that when folded edge to edge the band will fit within and fill a tire casing and a detachable elastic core having radial wings and arranged within said body part, said core being formed with a central air chamber and provided with tubes leading from said air chamber to the open air and with a flexible metallic lining.

6. A tire composed of a casing, a laterally folded sponge rubber packing therein, and a separately formed hollow central core of soft rubber in compression contact with the packing.

In testimony whereof I have affixed my signature.

KINSUKE FUKUDA.